United States Patent Office

2,749,251
Patented June 5, 1956

2,749,251

SOURCE OF LUMINOSITY

Edward Shapiro, Newton Highlands, Mass., assignor to Tracerlab, Inc., Boston, Mass., a corporation of Massachusetts No Drawing. Application October 29, 1953,
Serial No. 389,155

3 Claims. (Cl. 117—33.5)

This invention relates to an improved self-luminescent material and to methods for the preparation thereof.

Many organic and inorganic materials fluoresce under external ionizing radiation and if the radiation is sufficiently intense, this fluorescence can be visually detected. In the past, this property of inorganic phosphors has been widely used in the production of luminous markers of various kinds, a common example being the dials of watches. In general, watch dials are coated with a mixture of phosphor and radium, and the alpha particles emitted by the radium collide with the molecules of the phosphor and emit light. The same phenomenon is produced when radium is mixed with zinc sulphide which also has the quality of emitting light when activated by the ionizing radiation from the radium. Radioactive strontium, which has only recently become available, has also been mixed with inorganic phosphors of various types to produce artificial light sources.

Previously available artificial light sources of the general class referred to above have certain inherent disadvantages which limit their effectiveness as light sources or standards. Mixtures of phosphor and Sr-90 which emit beta radiation of high energy, and mixtures of phosphors and radium, which emit high energy nuclear radiation, are hazardous to personnel and require a considerable amount of shielding during the preparation, handling, and use of the light source. Shielding obviously adds to the cost of the source and presents the further problem of arranging the shielding to permit the emission of light while absorbing hazardous radiation from the radium or strontium. Another disadvantage of presently available radium activated phosphors is that the luminosity diminishes at a rate of about 30 to 50% per year due to the destruction of the phosphor by densely ionizing particles. Therefore, the phosphor is not particularly suited for use as a standard light source as may be required for the calibration of a light sensitive instrument, for example.

With an appreciation of the foregoing problems of the prior art, applicant has as a general object of his invention to provide a light source which overcomes these disadvantages.

A further object of the invention is to provide an activated phosphor which has no appreciable health hazard.

Another object of the invention is to provide a light source whose luminosity is appreciably more constant over long periods of time than radium or strontium-activated phosphors.

A still further object of the invention is to provide a light source having the foregoing properties and which may be produced at relatively low cost.

In the attainment of the foregoing objects, the invention contemplates a self-luminescent material consisting of an inorganic phosphor intimately mixed with a tritium containing compound, the radiations from the radioactive isotope, tritium, being used to activate the phosphor causing the phosphor to emit photons. Because of the low penetrating power of these radiations, about 0.8 milligram per square centimeter, it is necessary that the tritium compound be in intimate contact with the phosphor in order that the radiations be able to penetrate the phosphor and produce light. A more particular object of the present invention, therefore, is to provide methods for compounding the phosphor with the tritiated material so as to achieve the degree of intimate mixing required for useful light production.

Tritium is particularly suitable as a radiation source for exciting the phosphor because of its availability at relatively low cost (currently 10 cents/mc.), and the extremely low penetrating power of the beta radiation therefrom. The latter feature permits the use of the tritium with a minimum of shielding for the safe handling thereof, thus rendering it particularly useful in applications where personnel are likely to be in close contact therewith. On the other hand, if the radiations are to be effective to excite a phosphor, there must be intimate contact of the tritium with the phosphor. It has been found that the class of compounds comprising that group of organic compounds which are wax-like in texture in the solid state and which can be produced by the hydrogenation of unsaturated precursors, are particularly suitable for the intimate mixing and coating of the phosphor particles, and in accordance with the invention, tritium is incorporated into the molecule of such compounds, whereby the activity is likewise closely bonded to the phosphor. This class includes alcohols and paraffinic acids having chain lengths of 12–20 carbon atoms, such as hexadecanol ($C_{16}H_{33}OH$), octadecanol ($C_{18}H_{37}OH$), hexadecanoic or palmitic acid ($C_{15}H_{31}CO_2H$), and octadecanoic or stearic acid ($C_{17}H_{35}CO_2H$), which are respectively made by the hydrogenation, using a mixture of hydrogen and tritium, of hexadecanol, octadecenol, hexadecenoic acid and octadecenoic acid. In addition, zinc and calcium salts of the aforementioned hexadecanoic and octadecanoic acids, prepared by neutralization of the acids (tritiated), are suitable. The specific activity of the alcohol or paraffinic acid molecule, i. e., the number of tritium atoms per molecule of the organic compound, is determined by the ratio of tritium to hydrogen in the reducing gas mixture. When intimately mixed with a suitable phosphor, the light output of the resulting composition is dependent, to a great extent, on the specific activity of the organic compound. Specific activities readily obtainable with conventional hydrogenation techniques, and suitable for use in the production of light sources of the intensities contemplated by the invention, fall in the range of one to two hundred curies/gram.

One of the aforementioned tritiated compounds, prepared as above described, is intimately mixed with a suitable inorganic phosphor, of which several are available, a number of methods having been developed for obtaining intimate contact and optimum utilization of the energy of the tritium radiation, which will now be described. Stearic acid has been found especially suitable for the practice of the invention, and the following illustrative examples are directed to the use thereof, but it will be understood that the described methods are equally applicable to the other organic compounds of the aforementioned class, except for slight changes in temperature in Examples IV and V, the values of which are readily available from the handbooks.

Example I

Any inorganic phosphor which is readily excited to fluorescence or phosphorescence by cathode rays can be used. Examples of these are zinc sulfide: silver activated; zinc sulfide: copper activated; zinc sulfide, cadmium sulfide: silver activated; zinc orthosilicate; manganese activated. The inorganic phosphor is suspended in an organic solvent such as alcohol, acetone or diethyl ether in which the appropriate quantity of tritiated stearic acid of predetermined specific activity is dissolved. This mixture is poured onto a suitable enclosed surface, for example, glass, plastic or a reflecting metal, which constitutes the light producing surface. The suspended phosphor particles settle onto the surface from the solution of tritiated stearic acid in solvent. The solvent is then evaporated at room temperature or at elevated temperatures up to a few degrees below the boiling point of the solvent. As the solvent evaporates, the concentration of tritiated stearic acid increases and when all of the solvent has been evaporated, tritiated stearic acid remains on the phosphor providing an effective coating of the phosphor particles.

*Example II*

A suspension of a phosphor selected from the above group in an organic solvent is poured onto the light-producing surface, which may be glass, plastic, or a reflecting metal. After the phosphor settles from the suspension, a solution of tritiated stearic acid in solvent (alcohol or diethyl ether) is added to the first solvent. The mixed solvents are then evaporated at room temperature or at an elevated temperature up to a few degrees below the boiling point of the solvent. As the solvents evaporate, the concentration of stearic acid increases, and intimately coats the phosphor particles when evaporation is complete.

*Example III*

A suspension of phosphor in an organic solvent containing tritiated stearic acid is prepared as in Example I. After the mixture is poured onto the light producing surface and after the phosphor has settled, water is added to the solvent causing stearic acid to settle from the solution and surround the phosphor particles. The residual solvent is removed by evaporation at room or elevated temperatures below the boiling point of the solvent.

*Example IV*

A mixture of a suitable phosphor and tritiated stearic acid, both solids at room temperature, is placed in a container such as a glass vial with a screw cap. This mixture is shaken until intimate mixing of the phosphor and tritiated stearic acid is obtained. The powder so formed is luminescent. Periodic heating to temperatures just above the melting point of stearic acid (69.3° C.) serves to make the shaking process more effective in producing a thorough mixture.

*Example V*

Phosphor is deposited on a surface by allowing it to settle from a suspension. After removing the liquid medium, the phosphor is exposed in an evacuated chamber to tritiated stearic acid vapors until the required amount of tritiated stearic acid has coated the phosphor producing a self-luminescent material. The temperature of stearic acid should be such that its vapor pressure is appreciably greater than the pressure maintained in the evacuated system while the phosphor surface is cooled by air or water. Suitable conditions of temperature and pressure are these: tritiated stearic acid 150° C., phosphor surface 30° C., pressure in system $10^{-4}$ mm. The distance between the surface of the tritiated stearic acid and the phosphor should be less than the mean free path of the molecules which at vapor pressure of $10^{-4}$ mm. is about 50 centimeters.

*Example VI*

An aqueous suspension of phosphor containing 0.1%–1.0% sodium or potassium silicate is transferred to the surface being coated. The liquid is allowed to evaporate leaving a uniform coating of thickness determined by the weight of phosphor per unit volume of phosphor and the area covered. A tritiated stearic acid solution in an organic solvent is dropped gently onto the surface of the dried phosphor, spreading uniformly throughout the phosphor. Evaporation to dryness leaves behind a tritiated stearic acid coating on the phosphor, uniformly dispersed.

The penetration distance for a maximum energy tritium β-ray (18 kilovolts) is 0.8 milligram per square centimeter, which is equivalent to a thickness of 0.008 millimeter of water or other material having a density of one gram per cubic centimeter. Only a small percentage (about 5%) of the β-rays emitted by tritium have energies higher than 15 kilovolts, and since the majority of the β-rays from tritium have energies between 5 and 7 kilovolts, it is evident that the tritiated coating on the phosphor must be very thin in order that the emitted beta rays are not absorbed almost entirely in the coating without the emission of photons. It has been estimated that for a coating thickness of .008 millimeter, only 10% of the energy of the tritium beta rays would be expended in the phosphor, the rest being absorbed in the tritiated organic coating compound. Therefore, in order to increase the efficiency of the tritium β-ray energy for light production, it is essential to make the coating thickness thinner than 0.008 millimeter. A thickness of 0.0004–0.0008 millimeter is found to be satisfactory permitting a possible efficiency utilization of 63–80% of the β-ray energy.

Commercially available inorganic phosphors have an average diameter of between 1 and 7 microns, or .001–.007 millimeter. The ratio of the weight of tritiated stearic acid to the weight of phosphor can be calculated in terms of the average phosphor particle diameter, D, as follows:

$$\frac{\text{weight phosphor}}{\text{weight tritiated stearic acid (tsa)}} = \frac{\frac{\pi D^3 \rho_{\text{phosphor}}}{6}}{\pi D^2 t \rho_{\text{tsa}}} = \frac{D \rho_{\text{phosphor}}}{6 t \rho_{\text{tsa}}}$$

where $\rho$ = density in grams per cubic centimeter
$D$ = phosphor diameter in millimeters
$t$ = tsa thickness in millimeters Since the density of inorganic phosphors is about 4 gm./cm.³ and the density of tritiated stearic acid is 0.85 gm./cm.³, the ratio becomes:

$$\frac{\text{weight phosphor}}{\text{weight}_{\text{tsa}}} = \frac{4.1 D}{5.1 t} = 0.8 \frac{D}{t}$$

The following table gives the value of this ratio for coatings of .0004 and .0008 millimeter thickness on phosphor particles having diameters of 1, 3, 5 and 7 microns:

| Coating Thickness $t$ | Phosphor Diameter (millimeters) | | | |
|---|---|---|---|---|
| | .001 | .003 | .005 | .007 |
| .0004 | 2 | 6 | 10 | 14 |
| .0008 | 1 | 3 | 5 | 7 |

Light is produced uniformly throughout the phosphor coated with tritiated stearic acid, but because of the phenomena of scattering of light photons by the crystals, and absorption of the emitted light photons by the crystals, the efficiency of the light source decreases rapidly with increasing phosphor thickness. Measurements on several phosphors of the zinc orthosilicate and zinc sulfide types, indicate that thicknesses of coated phosphor of the order of 2–3 milligrams per square centimeter are optimum. The following table gives the relative brightness of tritium activated zinc orthosilicate light sources as a function of thickness of the coated phosphor deposit and total number of millicuries of tritium:

| Thickness, mg/cm.² | Millicuries Tritium | Relative Brightness |
|---|---|---|
| 13.5 | 3.1 | 1 |
| 27 | 6.3 | 1.2 |
| 69 | 15 | 1.3 |

It is evident that the efficiency of light production, as measured by brightness per millicurie tritium, decreases with increasing coating thickness since an increase in the amount of tritium by a factor of 4.7 (from 3.1 to 15 millicuries) resulted in an increase in brightness by a factor of only 1.5.

In going to thinner deposits of coated phosphor it is necessary to use increasingly higher specific activity tritiated stearic acid (i. e. more millicuries of tritium per milligram of tritiated stearic acid) in order to have a sufficient number of millicuries of tritium to give a desired brightness. Estimates of the theoretical maximum brightness obtainable from one millicuries of tritium give a value of 1.8 microlamberts over an area of one square centimeter for a phosphor emitting 5200 A. wave length light (that wave length to which the dark adapted eye is most sensitive). Thus it is seen, that if a light source having a brightness of 20 microlamberts and an area of 1 square centimeter is desired, 11 millicuries of tritium are required, assuming the efficiency to be 100%. Since the weight of phosphor is 2 milligrams for the optimum thickness of 2 mg./cm.², the weight of tritiated stearic acid to be used is about $\frac{1}{10}$ of 2 or 0.2 milligram. Thus, the specific activity of the triated stearic acid must be at least 11 millicuries in 0.2 milligram or 55 curies/gram. In actual practice the efficiency is less than 100%, so that even higher specific activities are required. Lower specific activities can be used with thicker coatings, but this can be done only at the expense of reduced efficiency and therefore greater tritium consumption.

A gain of 20–30% in efficiency can be realized if a thin deposit (less than 3 mg./cm.²) is used in combination with a reflector. The reflector may consist either of a highly reflecting metallic disk disposed on the reverse side of the deposit, or of a vacuum evaporated highly reflecting metallic film on the reverse side of the deposit. In either case, the reflecting surface reflects those photons which would otherwise go out the reverse side of the phosphor deposit and be lost to the eye or instrument observing the obverse face. It will be evident from the foregoing that the deposit of coated phosphor on the reflector must be very thin in order that an appreciable fraction of the reflected light be transmitted through the obverse face. Increases of 25–30% in brightness have been obtained through the use of a reflector with deposit thicknesses of about 2 mg./cm.². It follows that in each of Examples I through VI above, the deposit can be made directly on a reflecting surface.

The light source constructed in accordance with the invention may take a variety of forms, such as a flat button, a cylinder, or the like. After the coated phosphor is deposited on the light producing surface as above described, it is preferably enclosed to prevent dusting or flaking of the material and to shield the radiation from the tritium. The range of the tritium beta particles being only .008 millimeter of water, adequate shielding may be provided with a sheet of plastic of comparable thickness. Plastic sheets of this thickness being virtually unobtainable and extremely difficult to handle, it is preferable to form the container of a thicker section of clear plastic.

What is claimed is:

1. A source of luminosity comprising a member having a light reflecting surface having deposited on said surface a thin layer of inorganic phosphor particles in the range of 1 to 7 microns intimately coated with a tritiated compound selected from the group consisting of alcohols and paraffinic acids having chain lengths of 12 to 20 carbon atoms and are wax-like in texture in the solid state, the thickness of said layer being in the range of 2 to 3 milligrams per square centimeter and the thickness of the coating of the tritiated compound on the individual phosphor particles being in the range of approximately .0004 millimeter to approximately .0008 millimeter.

2. A source of luminosity comprising a member having a light reflecting surface having deposited on said surface a thin layer of inorganic phosphor particles of diameters in the range of 1 to 7 microns each thinly and intimately coated with tritiated stearic acid, the thickness of said layer being in the range of 2 to 3 milligrams per square centimeter and the thickness of the coating of stearic acid on the individual phosphor particles being in the range of approximately .0004 millimeter to approximately .0008 millimeter, the specific activity of said tritiated stearic acid being selected to produce a desired brightness.

3. A source of luminosity comprising a base having deposited on a surface thereof a thin layer of inorganic phosphor particles in the range of 1 to 7 microns intimately coated with a tritiated compound selected from the group consisting of alcohols and paraffinic acids having chain lengths of 12 to 20 carbon atoms and are waxlike in texture in the solid state, the thickness of said layer being in the range of 2 to 3 milligrams per square centimeter.

References Cited in the file of this patent

UNITED STATES PATENTS

| 1,718,626 | Bleecker | June 25, 1929 |
| 2,317,159 | Weil | Apr. 20, 1943 |

FOREIGN PATENTS

| 646,414 | Great Britain | Nov. 22, 1950 |